(No Model.)
L. D. HOSFORD & J. G. BASS, Jr.
GAS BURNER.
No. 341,381. Patented May 4, 1886.
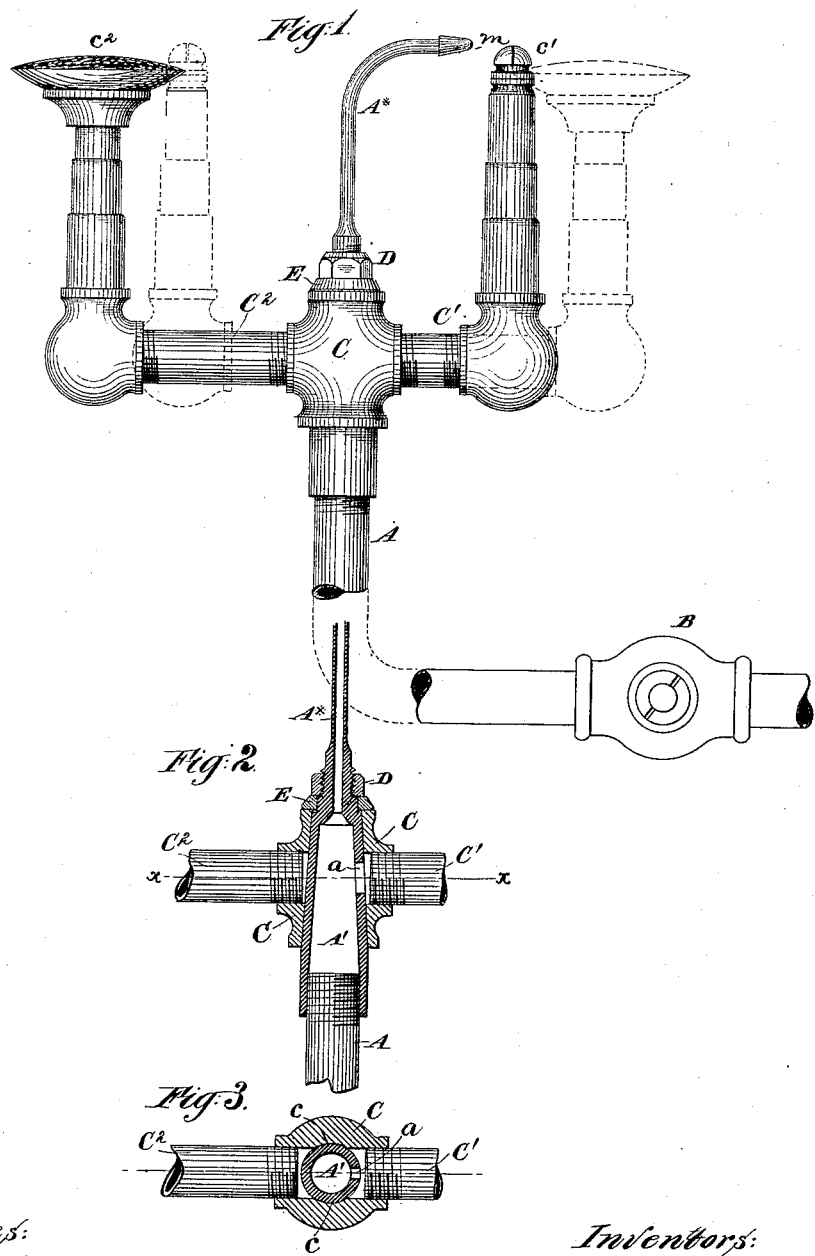

UNITED STATES PATENT OFFICE.

LEONARD D. HOSFORD AND JOB G. BASS, JR., OF BROOKLYN, NEW YORK, ASSIGNORS TO SAID LEONARD D. HOSFORD.

GAS-BURNER.

SPECIFICATION forming part of Letters Patent No. 341,381, dated May 4, 1886.

Application filed December 3, 1885. Serial No. 184,575. (No model.)

*To all whom it may concern:*

Be it known that we, LEONARD D. HOSFORD and JOB G. BASS, Jr., both of Brooklyn, Kings county, in the State of New York, have invented a certain new and useful Improvement in Gas-Burners, of which the following is a specification.

We employ two different burners—one adapted to produce heat and the other light—and mount both on a single central pivot, which is hollow and opens into the channel leading to one of the burners or the other, according as it is turned into different positions. In what we esteem the most complete form a small jet of gas issues constantly from the main or central pipe in the position to insure that the jet of gas is lighted, whether it be in the condition for producing light or for producing heat, so soon as a strong jet issues.

The following is a description of what we consider the best means of carrying out the invention.

Figure 1 is an elevation showing the whole. Fig. 2 is a central vertical section through a portion, and Fig. 3 is a horizontal section through a portion on the line $x\,x$ in Fig. 2.

Similar letters of reference indicate like parts in all the figures where they occur.

A is the gas-pipe, and A' the fixed taper plug, screwed tightly thereon. A* is the bent end of the latter, adapted to deliver a small jet of gas, $m$, constantly so long as the stop-cock B is open, which admits the gas to the interior of the device from a suitable connection to a street-main. (Not represented.)

C is a conically-bored turning piece, of brass or other suitable material, fitting tightly upon A', but free to be turned around thereon at will.

C' and $C^2$ are opposite branches from C, the branch C' carrying a burner, $c'$, suitable for giving light, and the branch $C^2$ carrying a burner, $c^2$, adapted for producing heat. There is an opening, $a$, in one side of the taper plug A', which allows the gas from A to flow into the branch which is presented on that side; but the block or piece C fits so tightly that it cannot flow around to the other branch.

In the use of the invention the gas is first let on by turning the cock B. Then the small jet $m$ is lighted, and the piece C and its attached branches turned to present one branch, C', or the other branch, $C^2$, in the position to receive the gas through the aperture $a$. If the branch C' receives the gas, its jet is united by the small jet $m$, and light is produced. If the device is turned around, the gas is first shut off by the turning motion of C, so that it is for a brief period shut off from both branches, the aperture $a$ being presented against one of the surfaces $c$, which fit tightly, (see Fig. 3;) but so soon as the turning has progressed a little further gas will be delivered from $a$ into the other branch, $C^2$, and be delivered under conditions adapted to generate heat suitable for soldering or for other operations requiring heat, and the heat-producing jet will be instantly ignited by the constant small jet $m$. This condition will continue until it is again turned. The proper degree of tightness of the fit may be insured by adjusting the nut D, which is screwed upon A, and acts on C through a washer, E.

It will be understood that any suitable hooks or other supports for small articles to be soldered or otherwise treated may be fixed on the burner $c^2$ or the device, so as to conveniently present articles of jewelry or other articles to the heating flame.

Care should be taken in setting up the fixtures to present the aperture $a$ on the side nearest the workmen, so that the branches, when receiving gas, shall always be in convenient position to render the jets available.

Modifications may be made in the forms and proportions without departing from the principle or sacrificing the advantages of the invention. We can use three or even more branches adapted to deliver the gas in three different conditions, or in the two conditions with different quantities.

Parts of the invention can be used without the whole. We can dispense with the constant small jet $m$ and light the several jets by other means.

We claim as our invention—

1. The changeable gas-burner described, having the central plug, A, with an aperture, $a$, on one side, in combination with the tightly-fitted turning piece C, having branches C' and $C^2$, one having an illuminating and the other a heating burner, arranged for joint operation as herein specified.

2. The changeable or turning piece having branches $C'$ $C^2$, with a heating-burner on one and an illuminating-burner on the other, combined with a gas-supply, $A'$ $a$, and a burner, $A^*$, arranged to serve as an igniter to either burner, as set forth.

3. The general controlling-cock B, pipe A, fixed central plug, $A'$, having an aperture, $a$, in one side, and turning piece C, having branches $C'$ $C^2$, in combination with each other and with the burner $A^*$, and arranged for joint operation substantially as herein specified.

In testimony whereof we have hereunto set our hands, at New York city, New York, in the presence of two subscribing witnesses.

LEONARD D. HOSFORD.
JOB G. BASS, Jr.

Witnesses:
M. F. BOYLE,
THOMAS DREW STETSON.